(12) United States Patent
Krishnamoorthy et al.

(10) Patent No.: US 12,036,942 B2
(45) Date of Patent: Jul. 16, 2024

(54) DEPLOYABLE PROTECTION PLATE

(71) Applicant: Rivian IP Holdings, LLC, Irvine, CA (US)

(72) Inventors: Revathi Krishnamoorthy, Rancho Santa Margarita, CA (US); Mark Lennard Taylor, Laguna Beach, CA (US); Henning Wigger, Detroit, MI (US); Kevin Wheldon, Irvine, CA (US); Andres Meana, Irvine, CA (US); Shanmugha Kuppuraj, Farmington Hills, MI (US)

(73) Assignee: Rivian IP Holdings, LLC, Irvine, CA (US)

(*) Notice: Subject to any disclaimer, the term of this patent is extended or adjusted under 35 U.S.C. 154(b) by 0 days.

(21) Appl. No.: 17/883,252

(22) Filed: Aug. 8, 2022

(65) Prior Publication Data
US 2024/0042959 A1     Feb. 8, 2024

(51) Int. Cl.
*B60R 21/00* (2006.01)
*B60R 21/0134* (2006.01)
(Continued)

(52) U.S. Cl.
CPC .......... *B60R 21/34* (2013.01); *B60R 21/0134* (2013.01); *B60R 2021/0053* (2013.01);
(Continued)

(58) Field of Classification Search
CPC ....................... B60R 21/0134; B60R 21/34
See application file for complete search history.

(56) References Cited

U.S. PATENT DOCUMENTS

| 6,089,628 A * | 7/2000 | Schuster | ................ B60R 19/14 |
|  |  |  | 293/118 |
| 6,394,512 B1 * | 5/2002 | Schuster | ................ B60R 19/12 |
|  |  |  | 293/118 |

(Continued)

FOREIGN PATENT DOCUMENTS

| CA | 2657345 A1 * | 1/2008 | ............ B60R 19/40 |
| CN | 114987375 A  *  | 9/2022 | |

(Continued)

OTHER PUBLICATIONS

EURO-NCAP, for Safer Cars. (Apr. 2021). "European New Car Assessment Programme (EURO-NCAP)", Vulnerable Road User Testing Protocol, Version 9.00.
(Continued)

*Primary Examiner* — Paul N Dickson
*Assistant Examiner* — Maxwell L Meshaka
(74) *Attorney, Agent, or Firm* — Haley Guiliano LLP

(57) ABSTRACT

Methods and systems for preventing serious injury or vehicle damage resulting from collisions between automotive vehicles and people, animals, or other objects are described. In some instances, the system may comprise an object detection system configured to detect a human prior to impact with an automotive vehicle comprising the object detection system, and further configured to send a first activation signal upon detection of the human; a first actuator attached to the automotive vehicle; and a protection plate operatively connected to the first actuator and mounted on a structural component of the automotive vehicle; where upon receipt of the first activation signal by the first actuator, the protection plate is deployed from a non-vertical orientation into a vertical orientation and is vertically-positioned between a level of a front bumper of the automotive vehicle and a surface on which the automotive vehicle is traveling.

20 Claims, 10 Drawing Sheets

(51) Int. Cl.
  *B60R 21/34* (2011.01)
  *B60R 21/01* (2006.01)
  *B60R 21/013* (2006.01)

(52) U.S. Cl.
  CPC ............ *B60R 2021/0083* (2013.01); *B60R 2021/01013* (2013.01); *B60R 2021/01252* (2013.01); *B60R 2021/01306* (2013.01)

(56) References Cited

U.S. PATENT DOCUMENTS

| | | | | |
|---|---|---|---|---|
| 8,398,125 | B2 * | 3/2013 | Takahashi | B60R 21/34 16/222 |
| 9,783,153 | B2 * | 10/2017 | Farooq | B60R 19/023 |
| 10,471,999 | B2 * | 11/2019 | Yamamoto | B62D 25/082 |
| 10,679,437 | B1 * | 6/2020 | Dudar | G01M 17/00 |
| 10,787,139 | B2 * | 9/2020 | Farooq | B60R 19/38 |
| 11,077,785 | B2 * | 8/2021 | Pakiman | B60R 21/34 |
| 11,230,222 | B2 * | 1/2022 | Hellberg | B60Q 1/0491 |
| 11,518,305 | B2 * | 12/2022 | Burmistrov | G08G 1/166 |
| 11,524,647 | B2 * | 12/2022 | Herman | G01S 7/4004 |
| 2008/0174124 | A1 * | 7/2008 | Takahashi | B60R 21/34 292/45 |
| 2017/0129448 | A1 * | 5/2017 | Farooq | B60R 19/38 |
| 2018/0281871 | A1 * | 10/2018 | Yamamoto | B62D 25/18 |
| 2019/0381961 | A1 * | 12/2019 | Farooq | B60R 19/38 |
| 2020/0247208 | A1 * | 8/2020 | Kunkel | B60G 17/06 |
| 2020/0298745 | A1 * | 9/2020 | Hellberg | B60R 21/34 |
| 2020/0324684 | A1 * | 10/2020 | Pakiman | F21S 41/196 |
| 2022/0111792 | A1 * | 4/2022 | Burmistrov | B60W 30/0956 |
| 2022/0126781 | A1 * | 4/2022 | Conners | B60R 19/205 |
| 2022/0176902 | A1 * | 6/2022 | Herman | B60W 50/14 |
| 2023/0030999 | A1 * | 2/2023 | Liollio | E02F 9/262 |

FOREIGN PATENT DOCUMENTS

| | | | | |
|---|---|---|---|---|
| DE | 10002148 B4 | * | 10/2008 | B60R 19/34 |
| FR | 3059287 A1 | * | 6/2018 | B60R 21/34 |
| GB | 2451622 A | * | 2/2009 | B60R 21/34 |

OTHER PUBLICATIONS

EURO-NCAP, for Safer Cars. (Feb. 2022). "European New Car Assessment Programme (EURO-NCAP)", Assessment Protocol—Vulnerable Road User Protection, Implementation 2023, Version 11.1.

* cited by examiner

DEPLOYABLE PROTECTION PLATE

INTRODUCTION

Collisions between humans (e.g., pedestrians or cyclists) and automotive vehicles (e.g., a truck or sports utility vehicle) may cause injuries to the lower leg (e.g., fracture of the tibia and/or smaller fibula) due to the focused impact of the vehicle's front bumper upon the lower leg.

BRIEF SUMMARY

Methods, devices, and systems are described herein which serve to reduce or prevent serious injury or vehicle damage in cases of collision between people, animals, or other objects and automotive vehicles, and particularly in cases of a collision between people and automotive vehicles having a high approach angle. Specifically, a "protection plate" is described that is attached to the front of the vehicle and is deployed when an object detection system mounted on or within the vehicle detects an object (e.g., a pedestrian, cyclist, tricycle, ball) within or adjacent to the trajectory of the vehicle. Upon deployment, the protection plate is moved into a vertical position between the level of the front bumper of the vehicle and the road or surface on which the vehicle is traveling. In the deployed position, the protection plate may, for example, provide support to the lower leg of a person if a collision occurs and reduce the bending moment imparted to the leg, thereby reducing the frequency and severity of injury. The protection plate may also prevent an object from going underneath the vehicle if a collision occurs, and thereby reduce the likelihood of damage to the undercarriage of the vehicle.

Disclosed herein are systems for reducing lower leg injuries resulting from automotive vehicle-human collisions, the systems comprising: an object detection system configured to detect a human prior to impact with an automotive vehicle comprising the object detection system, and further configured to send a first activation signal upon detection of the human; a first actuator attached to the automotive vehicle; and a protection plate operatively connected to the first actuator and mounted on a structural component of the automotive vehicle; wherein upon receipt of the first activation signal by the first actuator, the protection plate is deployed from a non-vertical orientation into a vertical orientation and is vertically-positioned between a level of a front bumper of the automotive vehicle and a surface on which the automotive vehicle is traveling.

In some embodiments, the detection of the human comprises the use of radio detection and ranging (Radar), light detection and ranging (Lidar), image-based detection, acoustic detection, thermal detection, heartbeat detection, or any combination thereof. In some embodiments, the human is detected if they are present within or proximal to a trajectory of the vehicle. In some embodiments, the human is detected if they are present within 100, 90, 80, 70, 60, 50, 40, 30, 20, or 10 feet of the front of the automotive vehicle.

In some embodiments, the object detection system is further configured to discriminate between humans and inanimate objects, and sends the first activation signal only if a human is detected.

In some embodiments, the system further comprises a sensor module for detecting a pitch of the automotive vehicle, and the first actuator is configured to adjust the vertical orientation of the protection plate to compensate for the pitch. In some embodiments, the object detection system is further configured to send a second activation signal upon detection of the human, and the system comprises a second actuator configured to raise a rearmost edge of a front hood of the automotive vehicle upon receipt of the second activation signal.

In some embodiments, the first actuator comprises a mechanical, electromechanical, pneumatic, hydraulic, or pyrotechnic actuator. In some embodiments, the first actuator is a mechanical actuator comprising a compressed spring and telescopic shaft/pin mechanism. In some embodiments, the protection plate is deployed within 1.0 seconds of detecting a human.

In some embodiments, the protection plate is attached to the automotive vehicle by a hinged mechanism such that it rotates from the non-vertical orientation into the vertical orientation when deployed. In some embodiments, the automotive vehicle comprises a high approach angle. In some embodiments, the protection plate is configured to be returned to its stowed position after deployment.

Also disclosed herein are methods for reducing lower leg injuries resulting from automotive vehicle-human collisions, the methods comprising: providing an object detection system configured to detect a human prior to impact with an automotive vehicle comprising the object detection system, wherein the object detection system is further configured to send a first activation signal upon detection of the human; and deploying a protection plate mounted on a structural component of the automotive vehicle upon receipt of the first activation signal by a first actuator that is operatively connected to the protection plate; wherein upon deployment the protection plate is moved from a non-vertical orientation into a vertical orientation and is vertically-positioned between a level of a front bumper of the automotive vehicle and a surface on which the automotive vehicle is traveling.

In some embodiments, the detection of the human comprises the use of radio detection and ranging (Radar), light detection and ranging (Lidar), image-based detection, acoustic detection, thermal detection, heartbeat detection, or any combination thereof.

In some embodiments, the object detection system is further configured to discriminate between humans and inanimate objects, and sends the first activation signal only if a human is detected.

In some embodiments, the method further comprises providing a sensor module for detecting a pitch of the automotive vehicle, and adjusting the vertical orientation of the protection plate to compensate for the pitch. In some embodiments, the object detection system is further configured to send a second activation signal upon detection of the human, and the method further comprises use of a second actuator to raise a rearmost edge of a front hood of the automotive vehicle upon receipt of the second activation signal. In some embodiments, the protection plate is deployed within 1.0 seconds of detecting a human.

Disclosed herein are non-transitory computer readable media storing one or more programs, the one or more programs comprising instructions which, when executed by one or more processors of a system, cause the system to: send a first activation signal upon detection of a human by an object detection system configured to detect a human prior to impact with an automotive vehicle comprising the object detection system; and deploy a protection plate mounted on a structural component of the automotive vehicle upon receipt of the first activation signal by a first actuator that is operatively connected to the protection plate; wherein upon deployment the protection plate is moved from a non-vertical orientation into a vertical orientation and is vertically-positioned between a level of a front bumper of the automotive vehicle and a surface on which the automotive vehicle is traveling.

INCORPORATION BY REFERENCE

All publications, patents, and patent applications mentioned in this specification are herein incorporated by reference in their entirety to the same extent as if each individual publication, patent, or patent application was specifically and individually indicated to be incorporated by reference in its entirety. In the event of a conflict between a term herein and a term in an incorporated reference, the term herein controls.

DETAILED DESCRIPTION

Figure 1A:
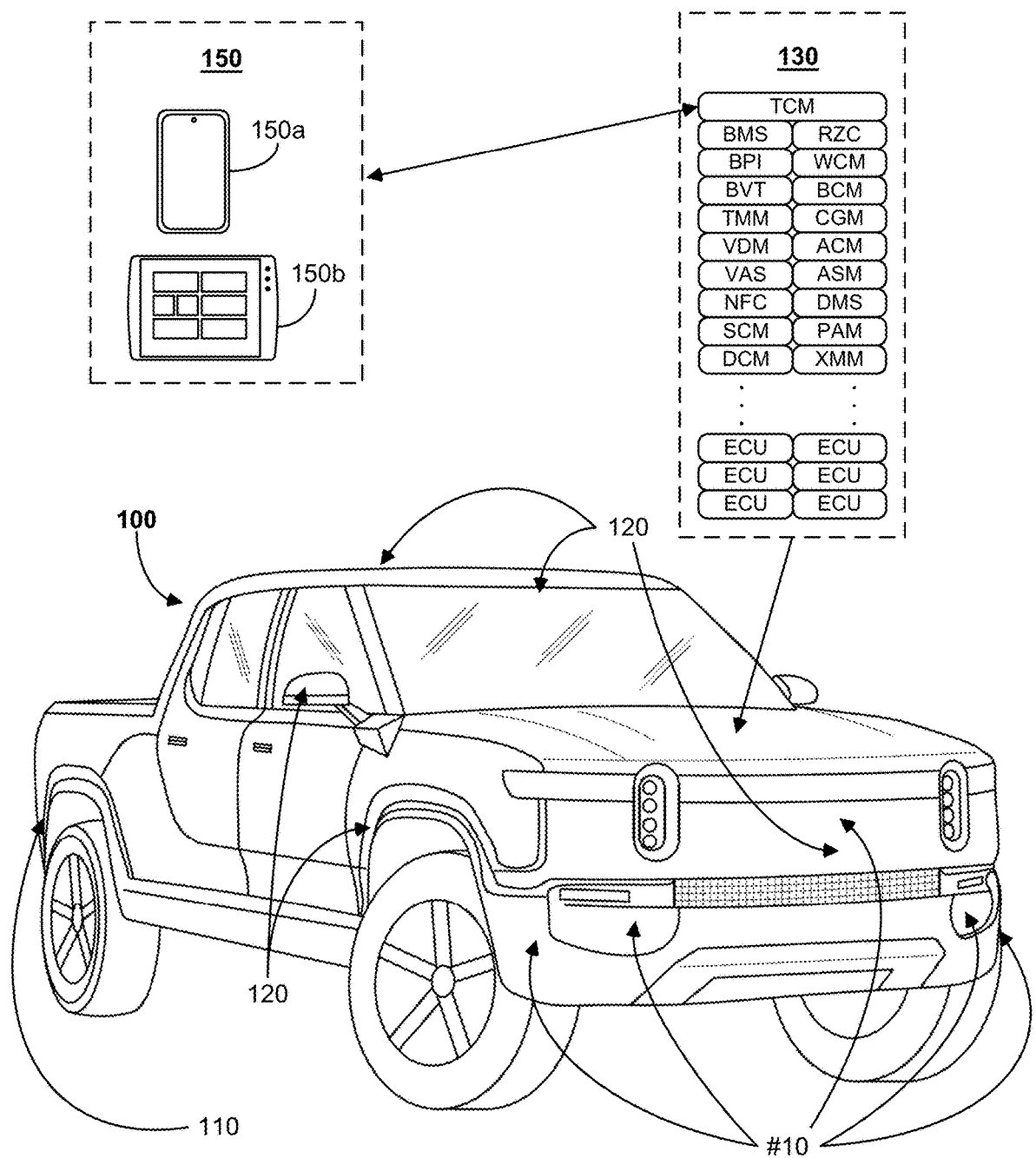
FIG. 1A provides an example vehicle.

Methods, devices, and systems are described herein which serve to reduce or prevent serious injury or vehicle damage in cases of collision between people, animals, or other objects and automotive vehicles, and particularly in cases of a collision between people and automotive vehicles having a high approach angle. Specifically, a "protection plate" is described that is attached to, or incorporated into, the front of the vehicle and is deployed when an object detection system mounted on or within the vehicle detects an object (e.g., a pedestrian, cyclist, or other object) within or adjacent to the trajectory of the vehicle. Upon deployment, the protection plate is moved into a position between the front bumper of the vehicle and the road or surface on which the vehicle is traveling. In the deployed position, the protection plate may, for example, provide support to the lower leg of a person if a collision occurs and reduce the bending moment imparted to the leg, thereby reducing the frequency and severity of injury. The protection plate may also prevent an object from going underneath the vehicle if a collision occurs, and thereby reduce the likelihood of damage to the undercarriage of the vehicle.

Various designs for the protection plate and the mechanism used for its deployment are described herein. Methods for the detection of people, animals, or other objects within or adjacent to the trajectory of a moving vehicle comprising an object detection system (e.g., an Advanced Driver Assistance System (ADAS)) are also described. In some instances, the disclosed methods and systems may further comprise additional process steps and/or functional components that, for example, enable discrimination between people and inanimate objects when triggering deployment of the protection plate, or that aid in reducing or preventing the frequency or severity of upper body and head injuries as well as leg injuries.

Definitions

Unless otherwise defined, all of the technical terms used herein have the same meaning as commonly understood by one of ordinary skill in the art in the field to which this disclosure belongs.

As used in this specification and the appended claims, the singular forms "a", "an", and "the" include plural references unless the context clearly indicates otherwise. Any reference to "or" herein is intended to encompass "and/or" unless otherwise stated, and encompasses any and all possible combinations of one or more of the associated listed items.

As used herein, the terms "includes, "including," "comprises," and/or "comprising" specify the presence of stated features, integers, steps, operations, elements, components, and/or units but do not preclude the presence or addition of one or more other features, integers, steps, operations, elements, components, units, and/or groups thereof.

As used herein, the term "about" a number refers to that number plus or minus 10% of that number. The term 'about' when used in the context of a range refers to that range minus 10% of its lowest value and plus 10% of its greatest value.

It can be appreciated that perfect verticality, horizontality, perpendicularity, parallelism, or other orientation may not be achievable in accordance with some examples or implementations of the disclosed devices and system due to, for example, manufacturing tolerances, operational limitations, etc. However, for the purposes of the present disclosure, the phrases "vertical", "horizontal", "perpendicular", "parallel", or other descriptors of orientation are understood to mean substantially vertical, substantially horizontal, substantially perpendicular, substantially parallel, or other orientation sufficient to achieve a desired resolution and/or a desired relevant effect as described and/or contemplated herein.

The section headings used herein are for organizational purposes only and are not to be construed as limiting the subject matter described.

Deployable Protection Plates

Many automotive vehicle-human collisions (e.g., collisions with pedestrians or cyclists) involve lower limb injuries (e.g., fracture of the femur and the tibia/fibula, or damage to the knee ligaments due to bending of the knee joint) and head injuries.

The sequence of events in a common vehicle-pedestrian collision comprises: (i) impact of the vehicle's front bumper with the lower limbs of the pedestrian, (ii) impact of the front edge of the vehicle's hood with the upper thigh or pelvis of the pedestrian, and (iii) impact of the top surface of the vehicle's hood and/or windshield with the head and upper torso of the pedestrian. A similar sequence of events occurs during collisions between a vehicle and a cyclist (e.g., a bicyclist or a motorcyclist).

Injuries to the lower limbs are possible even for collisions in which the vehicle is traveling at a relatively low velocity, and are particularly prevalent in collisions between humans (e.g., pedestrians or cyclists) and vehicles having a high approach angle (defined as the angle between the ground and the line drawn between the front tire and the lowest-hanging part at the front end of the vehicle, or alternatively, as the smallest angle in side view formed by the ground and the line tangent to the tire static-loaded radius arc and the underside of the vehicle, including all flexible components.

In order to reduce the severity of lower leg injuries in collisions between automotive vehicles and humans (e.g., pedestrians or cyclists), the force imparted by the impact between the vehicle's bumper and the pedestrian or cyclist's lower leg, can be reduced e.g., by increasing the contact area and by limiting the amount of knee and/or tibia bending that results from the impact.

A deployable "protection plate" mechanism is described herein that may be incorporated in or attached to the underside of the front end of a vehicle, and is deployed when an object detection system (e.g., an ADAS) mounted on or within the vehicle detects a person, animal, or other object within or adjacent to the trajectory of the vehicle. Upon deployment, the protection plate is moved from a non-vertical orientation into a substantially vertical position between the front bumper of the vehicle and the road or surface on which the vehicle is traveling. In the deployed position, the protection plate may provide, for example, support to the lower leg of a pedestrian or cyclist if a collision occurs and reduce the bending moment imparted to the leg, thereby reducing the frequency and severity of injury. Because it is deployable, in some instances it can have minimal impact on the vehicle's wind resistance when in the activated (non-deployed) state, and thus can have minimal impact on the vehicle's fuel efficiency, while still serving to reduce the frequency and/or severity of lower leg injuries resulting from collisions at low to moderate vehicle velocities.

In some instances, the deployable protection plate mechanism described herein may also be useful not just for reducing the frequency and/or severity of injuries to pedestrians and cyclists, but may also reduce the frequency and/or severity of injuries to people on roller skates, people on skateboards, people on standing-style scooters, etc., in the case of collisions with a vehicle comprising the deployable protection plate mechanism.

In some instances, the deployable protection plate mechanism described herein may also be useful in other situations, such as reducing injury to dogs of a certain size, reducing head-specific injuries to smaller people (e.g., toddlers), etc., in the case of collisions with a vehicle comprising the deployable protection plate mechanism.

Furthermore, the deployable protection plate mechanism described herein may also be useful for reducing damage to the vehicle itself (e.g., a car, truck, SUVs, etc.) itself, for example, if the protection plate prevents, e.g., a tricycle, garbage can, or other object from going under the vehicle.

FIG. 1A illustrates an example vehicle 100. Vehicle 100 may include multiple sensors 110, multiple cameras 120, and a control system 130. In some embodiments, vehicle 100 may be able to pair with a computing device 150 (e.g., smartphone 150a, tablet computing device 150b, or a smart vehicle accessory). As an example and not by way of limitation, a sensor 110 may be an accelerometer, a gyroscope, a magnetometer, a global positioning satellite (GPS) signal sensor, a vibration sensor (e.g., piezoelectric accelerometer), a light detection and ranging (LiDAR) sensor, a radio detection and ranging (RADAR) sensor, an ultrasonic sensor, a temperature sensor, a pressure sensor, a humidity sensor, a chemical sensor, an electromagnetic proximity sensor, an electric current sensor, another suitable sensor, or a combination thereof. As an example and not by way of limitation, a camera 120 may be a still image camera, a video camera, a 3D scanning system (e.g., based on modulated light, laser triangulation, laser pulse, structured light, light detection and ranging (LiDAR)), an infrared camera, another suitable camera, or a combination thereof. Vehicle 100 may include various controllable components (e.g., doors, seats, windows, lights, HVAC, entertainment system, security system), instrument and information displays and/or interactive interfaces, functionality to pair a computing device 150 with the vehicle (which may enable control of certain vehicle functions using the computing device 150), and functionality to pair accessories with the vehicle, which may then be controllable through an interactive interface in the vehicle or through a paired computing device 150.

Control system 130 may enables control of various systems on-board the vehicle. As shown in FIG. 1A, control system 130 may comprise one or more electronic control units (ECUs), each of which are dedicated to a specific set of functions. Each ECU may be a computer system (e.g., an Advanced Driver Assistance System as described further in FIG. 1B), and each ECU may include functionality provide by one or more of the example ECUs described below.

Features of embodiments as described herein may be controlled by a Vehicle Dynamics Module (VDM) ECU. The VDM ECU may control a number of different functions related to aspects of the vehicle's drivetrain, regenerative braking, suspension, steering, traction control, distribution of mass, aerodynamics, and driving modes. In some embodiments, the VDM ECU may, by way of example and not limitation, control vehicle acceleration, control vehicle energy regeneration, calculate torque distribution, provide traction control, control drive modes, provide odometer functions, control driveline disconnects, adjust damping, adjust roll stiffness, adjust ride height, automatically level a vehicle when on a slope, and control the emergency parking brake driver.

Vehicle 100 may include one or more additional ECUs, such as, by way of example and not limitation: a Central Gateway Module (CGM) ECU, a Telematics Control Module (TCM) ECU, a Vehicle Dynamics Module (VDM) ECU, an Experience Management Module (WM) ECU, a Vehicle Access System (VAS) ECU, a Near-Field Communication (NFC) ECU, a Body Control Module (BCM) ECU, a Seat Control Module (SCM) ECU, a Door Control Module (DCM) ECU, a Rear Zone Control (RZC) ECU, an Autonomy Control Module (ACM) ECU, an Autonomous Safety Module (ASM) ECU, a Driver Monitoring System (DMS) ECU, and/or a Winch Control Module (WCM) ECU. If vehicle 100 is an electric vehicle, one or more ECUs may provide functionality related to the battery pack of the vehicle, such as a Battery Management System (BMS) ECU, a Battery Power Isolation (BPI) ECU, a Balancing Voltage Temperature (BVT) ECU, and/or a Thermal Management Module (TMM) ECU.

Figure 1B:
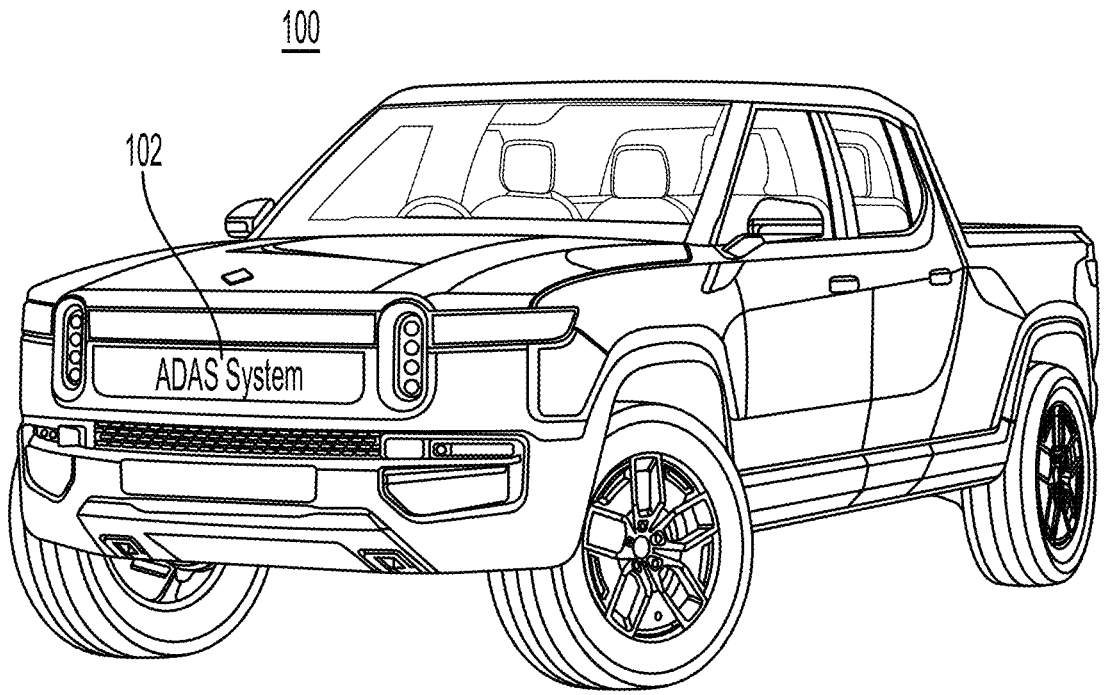
FIG. 1B provides a non-limiting illustration of a high approach angle vehicle that comprises an object detection system (e.g., an Advanced Driver Assistance System (ADAS)).

FIG. 1B provides a non-limiting illustration of automotive vehicle 100 that comprises an Advanced Driver Assistance System (ADAS) 102 (e.g., an object detection system) configured to detect people, animals, other vehicles, or other objects within or adjacent to the trajectory of the vehicle. Examples of automotive vehicles that may be equipped with an ADAS (or other object detection system) and the disclosed deployable protection plate mechanism include, but are not limited to, sedans, coupes, sports cars, station wagons, hatchbacks, convertibles, jeeps, sports utility vehicles (SUVs), minivans, pickup trucks, etc., or any automotive vehicle (e.g., an off-road vehicle) having a high approach angle (e.g., an approach angle of greater than 25°, greater than 30°, or greater than 35°). In some instances, the vehicle may be a gasoline-powered vehicle, a diesel-powered vehicle, an electric vehicle, or a hydrogen fuel cell-powered vehicle.

Advanced Driver Assistance Systems (ADAS) function to assist drivers with, e.g., driving and parking functions, and may further function to increase vehicle safety by detecting driver errors and/or nearby obstacles and responding accordingly. Such systems often comprise an integrated package of sensors, cameras, electronics, computer vision and image processing capabilities, etc., that may be integrated with the vehicle during manufacture and/or provided as an add-on feature. Examples of the functionality that may be provided by such systems include, but are not limited to, lane keeping assistance, lane change assistance, lane departure warning, blind spot warning, adaptive cruise control, manual parking assistance, dynamic braking support, rear cross-traffic warning, forward collision warning, and automatic emergency braking.

Forward collision warning may be based on any of a variety of detection modes. For example, the detection of people, animals, or other objects by an object detection system (e.g., an ADAS system) used in combination with the deployable protection plate mechanism described herein may comprise the use of radio detection and ranging (Radar), light detection and ranging (Lidar), image-based detection, acoustic detection, thermal detection, heartbeat detection (e.g., laser-based or electric potential sensor-based), or any combination thereof.

In some instances, people (e.g., pedestrians, cyclists, bicyclists, or motorcyclists), animals, or other objects may be detected by the object detection system (e.g., an ADAS) if they are present directly within, or proximal to, the trajectory of the vehicle. For example, in some instances, people, animals, or other objects may be detected if they are present within 10, 20, 30, 40, 50, 60, 70, 80, 90, 100, or more than 100 feet of the front of the automotive vehicle. In some instances, the pedestrian or cyclist may be detected if they are directly in line with vehicle's trajectory. In some instances, people, animals, or other objects may be detected if they are within ±0.5, ±1.0, ±1.5, ±2.0, ±2.5, ±3.0, ±3.5, ±4.0, ±4.5, ±5.0, ±6.0, ±7.0, ±8.0, ±9.0, ±10.0, ±15.0, or ±20.0 degrees of the centerline of the vehicle's projected trajectory.

In some instances, the object detection system (e.g., an ADAS system, or an associated component thereof) may be configured to send an activation signal to the deployable protection plate mechanism to trigger deployment upon detection of, e.g., a person, as will be described in more detail below. In some instances, the object detection system (e.g., an ADAS system) may be configured to discriminate between people or animals and inanimate objects (e.g., using image-based detection, acoustic detection, thermal detection, heartbeat detection, or any combination thereof), and may send the activation signal only if a person or animal is detected.

Figure 2:
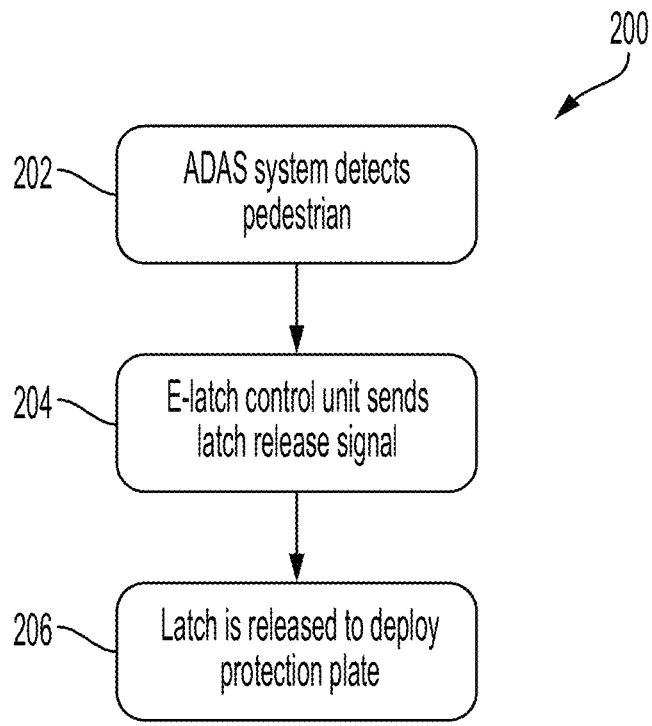
FIG. 2 provides a non-limiting example of a process flowchart for detecting a pedestrian and deploying a protection plate designed to reduce the severity of lower leg injury if a collision occurs between a vehicle and a pedestrian.

FIG. 2 provides a non-limiting example of a flowchart for a process, 200, for detecting, e.g., a pedestrian and deploying a protection plate designed to reduce the severity of lower leg injury if a collision occurs between a vehicle and the pedestrian. At step 202 in FIG. 2, a pedestrian is detected by an ADAS system that is incorporated into or mounted on an automotive vehicle. At step 204 in FIG. 2, the ADAS system (or an associated component thereof, e.g., an E-latch control unit) sends and activation signal (e.g., a latch release signal) to the deployable protection plate mechanism. At step 206 in FIG. 2, an actuator attached to the underside of the vehicle, and operably connected to the protection plate, is activated upon receipt of the activation signal sent by the ADAS system (or an associated component thereof) to deploy the protection plate. In some instances, for example, the actuator may comprise a compressed spring and telescopic shaft/pin mechanism, where the compressed spring and retracted telescopic shaft are held in a closed (active) position by a latch, and the latch is released upon receipt of the activation signal (e.g., latch release signal), thereby releasing the compressed spring and extending the telescopic shaft. In some instances, the protection plate is deployed from a non-vertical orientation into a vertical orientation (i.e., a substantially vertical orientation) in which the plate (or main body thereof) is positioned between the front bumper of the vehicle and the road or surface on which the vehicle is traveling.

Figure 3:
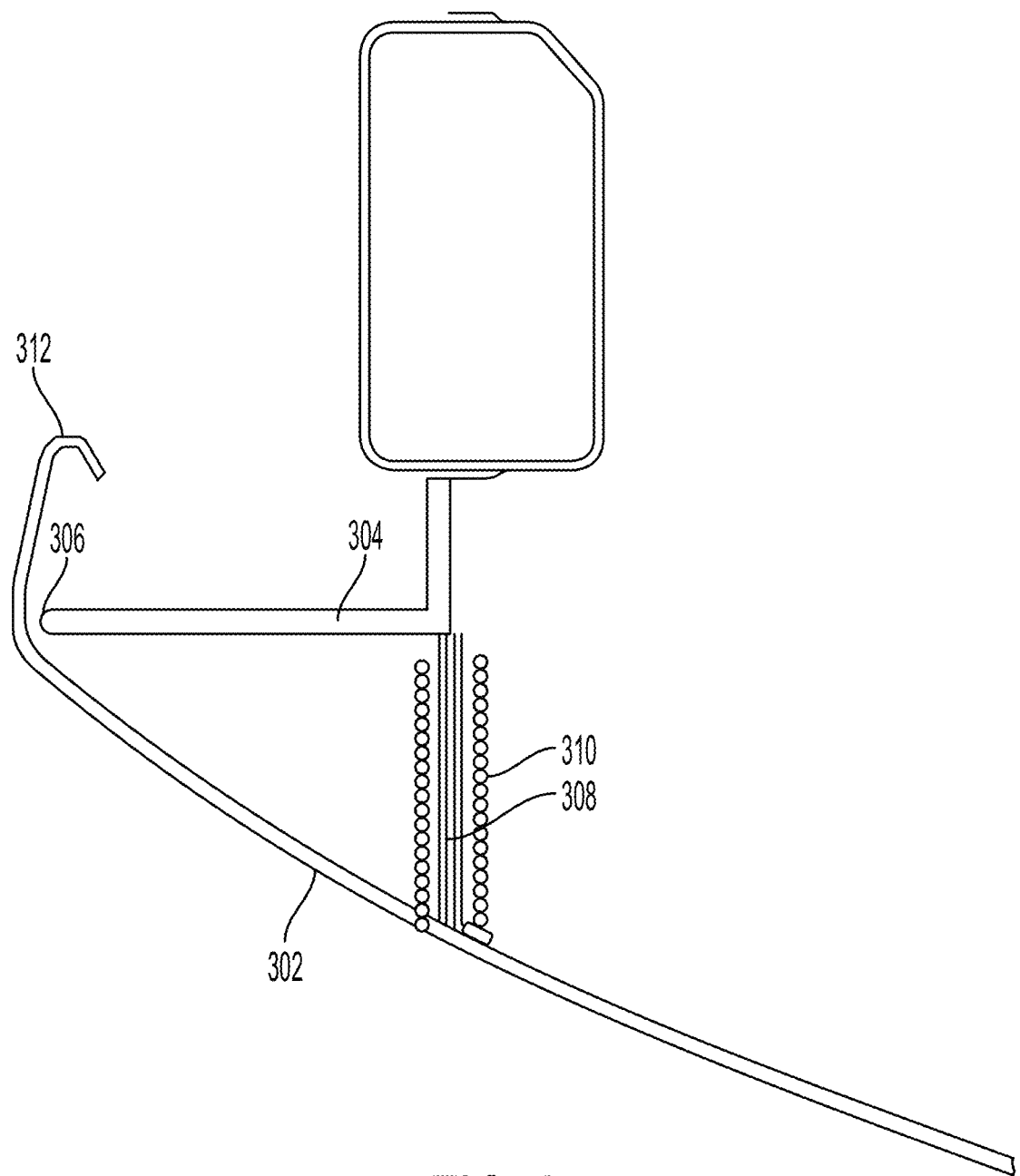
FIG. 3 provides a schematic side view illustration of a mechanism for deploying a protection plate (in a ready-to-deploy state) according to one non-limiting example described herein.

FIG. 3 provides a schematic side view illustration of a mechanism for deploying a protection plate 302 (in an "active" or ready-to-deploy state) according to one non-limiting example described herein. The protection plate 302 (viewed in cross-section) is attached to a structural component of the vehicle, e.g., the front bumper beam 304 (e.g., by a hinge 306), and is held in a swept-back, non-vertical orientation by a mechanical telescopic shaft/pin actuator 308 (comprising a compressed spring 310 and latch release) that is attached to the front bumper beam 304 at one end and to the protection plate 302 at the other. In some instances, the protection plate 302 (or the main body thereof) may comprise an approximately rectangular plate (in front view) having a flat or slightly curved profile (in side view). In some instances, the protection plate 302 may further comprise a hook-like feature 312 along the top edge of the plate, as illustrated in cross-section in FIG. 3, that wraps around the front bumper beam 304 to limit the range of forward motion during deployment.

Figure 4:
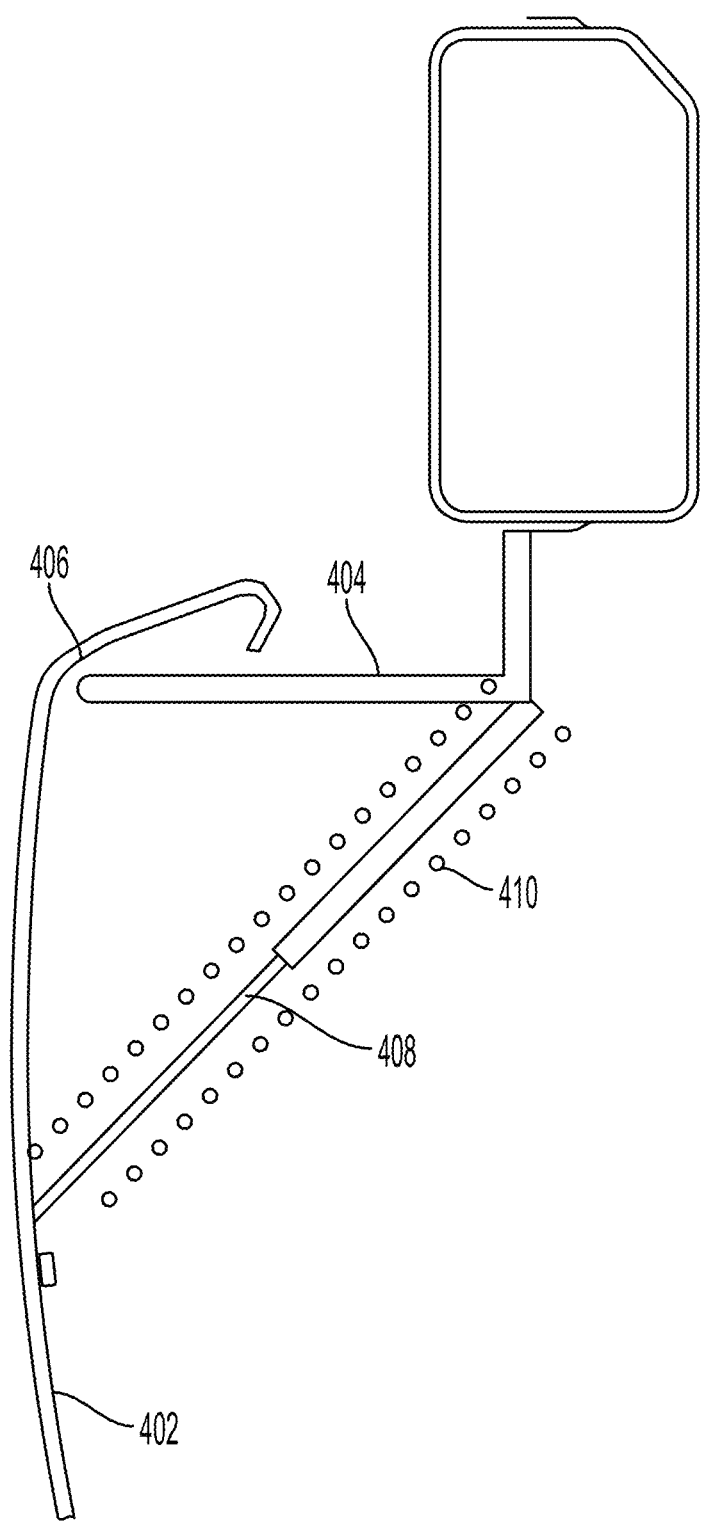
FIG. 4 provides a schematic side view illustration of a mechanism for deploying a protection plate (in a deployed state) according to one non-limiting example described herein.

FIG. 4 provides a schematic side view illustration of a mechanism for deploying a protection plate 402 (i.e., the protection plate 302 of FIG. 3 in the deployed state) according to the non-limiting example illustrated in and described for FIG. 3. Upon receipt of the activation signal (sent by the object detection system (e.g., an ADAS system) or associated component thereof) by the latch release mechanism, the spring 410 decompresses to extend the telescopic shaft of the actuator 408, which is locked into its extended form by the pin, and which causes the protection plate 402 to rotate relative to the axis of the hinge 406 and swing into a deployed, substantially vertical orientation in which the protection plate 402, or a portion thereof, is vertically-positioned between the level of the front bumper (e.g., the from bumper beam 404) and the road surface or ground on which the vehicle is traveling. In some instances, the deployed protection plate may be horizontally offset (e.g., in the forward direction) from the front bumper. The deployed protection plate 402 thus provides increased contact area for, e.g., a person's lower leg if a collision occurs, and limits the bending moment imparted to the lower leg by the impact.

In some instances, the deployed protection plate may be configured to reduce the frequency and/or severity of lower leg injuries resulting from vehicle-people collisions by up to 20%, 30%, 40%, 50%, 60%, 70%, 80%, or more than 80% at vehicle velocities (at the time of impact) of up to 5 mph, 10 mph, 15 mph, 20 mph, 25 mph, 30 mph, or more than 30 mph.

In some instances, the deployed protection plate may similarly reduce the frequency and/or severity of injuries to people on roller skates, people on skateboards, people on standing-style scooters, etc., in the case of collisions with a vehicle comprising the deployable protection plate mechanism.

In some instances, the deployed protection plate described may also reduce the frequency and/or severity of head-specific injuries to smaller people (e.g., children, toddlers), etc., or of injuries to dogs of a certain size (e.g., dogs of about bumper height or smaller), in the case of collisions with a vehicle by providing a larger contact area for impact and/or by preventing smaller people or dogs from being swept under the vehicle.

Furthermore, in some instances, the deployed protection plate mechanism may reduce damage to the vehicle itself by, for example, preventing an object (e.g., a tricycle, garbage can, or other object) from going under the vehicle.

As indicated above, in some instances, the protection plate (or the main body thereof) may comprise an approximately rectangular plate (in front view) having a flat or slightly curved profile (in side view). In some instances, the corners of the approximately rectangular plate may be chambered or rounded. In some instances, the protection plate may extend across the full width of the front of the vehicle. In some instances, the protection plate may extend across less than the full width of the front of the vehicle, e.g., it may extend across 70%, 75%, 80%, 85%, 90%, 95%, or 98% of the width of the front of the vehicle. In some instances, two or more protection plates may be mounted in parallel such that they are aligned with each other across the front of the vehicle when deployed, and collectively extend across 70%, 75%, 80%, 85%, 90%, 95%, or 100% of the width of the front of the vehicle.

In some instance, the protection plate (or the main body thereof) is fabricated from a rigid polymeric material, a carbon fiber or fiberglass material, a metal, an elastomeric material, or any combination thereof. Examples of suitable polymeric materials include, but are not limited to, polypropylene (PP), filled polypropylene, polyurethane (PU), polyvinyl chloride (PVC), acrylonitrile butadiene styrene (ABS), polyamides (PA), filled polyamides, polystyrene (PS), polyethylene (PE), polyoxymethylene (POM), polycarbonate (PC), acrylic (PMMA), and thermoplastic polyolefins (TPO), etc., or any combination thereof. Examples of suitable metals include, but are not limited to, aluminum, aluminum alloy, steel, magnesium, iron, titanium, etc., or any combination thereof. Examples of suitable elastomeric materials include, but are not limited to silicone elastomers, styrene-butadiene block copolymers, polyisoprene, polybutadiene, ethylene propylene rubber, ethylene propylene diene rubber, fluoroelastomers, polyurethane elastomers, nitrile rubbers, or any combination thereof.

In some instances, the shape, dimensions, materials, and/or positioning of the protection plate upon deployment may be optimized for a particular application or primary intended use. For example, in some instances, the protection plate may be padded (e.g., using a layer of foam rubber or other compressible material) and/or positioned closer to the road or surface on which the vehicle is traveling upon deployment to soften the impact between, e.g., a small child or toddler and the protection plate upon collision. In some instances, e.g., to prevent inanimate objects such as tricycles or garbage cans from being swept under the vehicle, the deployed protection plate may be positioned slightly forward (e.g., 2, 4, 6, 8, 10, 12, or more than 12 inches in front of) the position of the front bumper.

In some instances, the deployed protection plate may have a clearance between its lower edge and the road surface or ground on which the vehicle is traveling of between 4 inches and 8 inches, between 5 inches and 7 inches, or about 6 inches. In some instances, the clearance between the lower edge of the deployed protection plate and the road surface or ground may be at least 2", at least 3", at least 4", at least 5", at least 6", at least 7", at least 8", at least 9", or at least 10". In some instances, the clearance between the lower edge of the deployed protection plate and the road surface or ground may be at most 10", be at most 9", be at most 8", be at most 7", be at most 6", be at most 5", be at most 4", be at most 3", or be at most 2". Any of the lower and upper values described in this paragraph may be combined to form a range included within the present disclosure, for example, in some instances the clearance between the lower edge of the deployed protection plate and the road surface or ground may range from about 3" to about 7". Those of skill in the art will recognize that the clearance between the lower edge of the deployed protection plate and the road surface or ground may have any value within this range, e.g., about 6.8".

Figure 5:
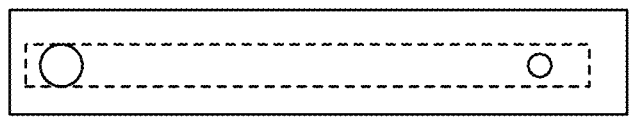
FIG. 5 provides a schematic illustration of a telescopic shaft/pin mechanism for actuating deployment of a protection plate according to one non-limiting example described herein.
Figure 5:
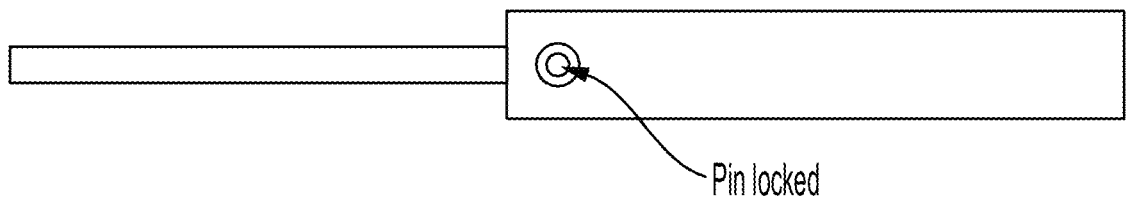

In some instances, the one or more actuators used to deploy the protection plate may comprises a mechanical actuator, an electromechanical actuator, a pneumatic actuator, a hydraulic actuator, a pyrotechnic actuator, or any combination thereof. FIG. 5 provides a schematic illustration of a mechanical actuator comprising a telescopic shaft/pin mechanism (including a compressible spring (not shown), and a latch mechanism (not shown)) for actuating the deployment of the protection plate according to one non-limiting example. In the active (non-deployed) state, the telescopic shaft is retracted and the spring (which may be an internal spring or an external spring) is compressed and held in place by the latch mechanism. In the deployed state, the internal or external spring (not shown) has been released by the latch mechanism (not shown), and the telescopic shaft is extended and locked into place by the pin (or "locking pin", which may be a spring-loaded pin).

In some instances, 1, 2, 3, 4, or more than 4 actuators may be used to deploy the protection plate. In some instances, 2, 3, 4, or more than 4 actuators may be used to deploy two, three, four, or more than four protection plates in parallel that, when deployed, are aligned with each other and collectively extend across 70%, 75%, 80%, 85%, 90%, 95%, or 100% of the width of the front of the vehicle.

In some instances, the response time for detecting a person, animal, or other object, sending an activation signal, and actuating the deployment of the one or more protection plates (collectively referred to herein as the deployment time) is such that the one or more protection plates are deployed within 1.5 seconds, 1.4 seconds, 1.3 seconds, 1.2 seconds, 1.1 seconds, 1 second, 0.5 seconds, 0.4 seconds, 0.3 seconds, 0.2 seconds, 0.1 seconds, or 0.05 seconds of detecting the person, animal, or object.

In some instances, the protection plate may be manually reset (or returned to its stowed position) following deployment, e.g., in the case of the telescopic shaft/pin mechanism described for FIG. 5, the locking pin may be manually retracted and/or the plate manually pushed back into its "active" position to compress the spring. In some instances, the protection plate may be automatically reset (or returned to its stowed position) following deployment, e.g., in the case of the telescopic shaft/pin mechanism described for FIG. 5, the system may further comprise an electronic mechanism (e.g., another actuator) for retracting the locking pin and/or pushing the plate back into its "active" position to compress the spring. In some instances, e.g., where other types of actuators are used, the protection plate may be automatically reset (or returned to its stowed position) following deployment simply be reversing the action of, e.g., a hydraulic actuator.

Figure 6:
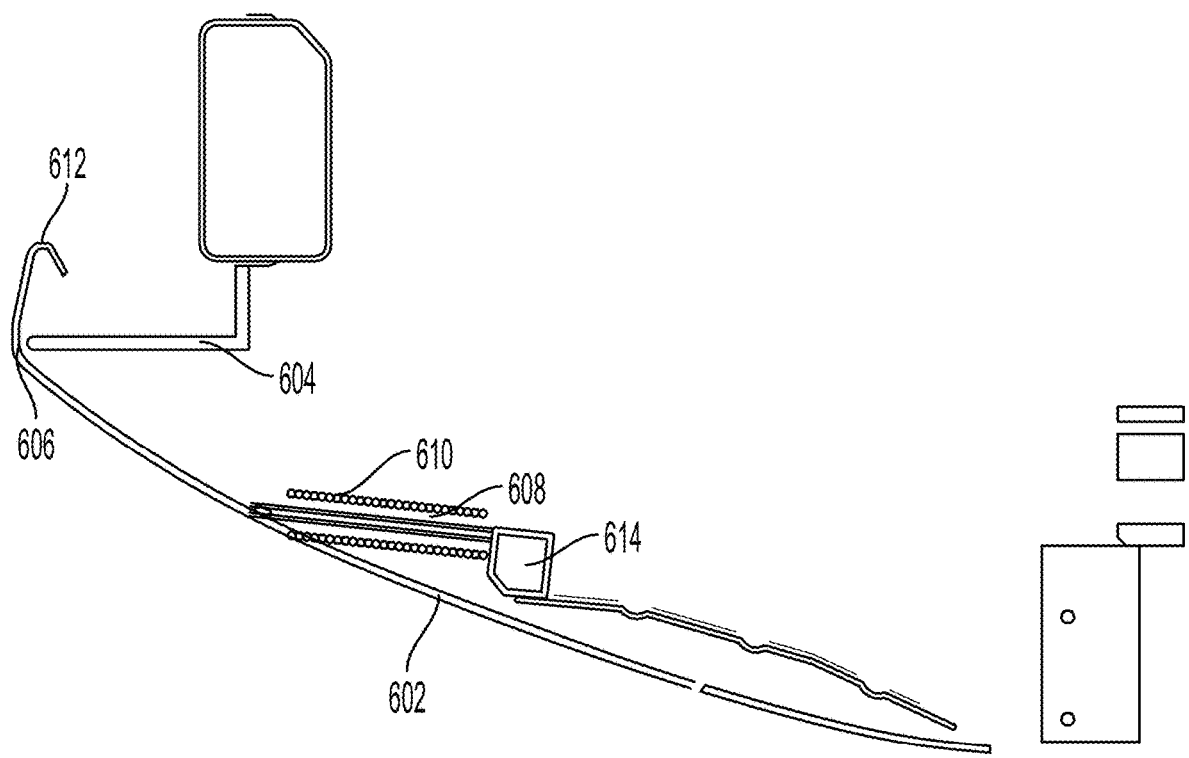
FIG. 6 provides a schematic side view illustration of a mechanism for deploying a protection plate (in a ready-to-deploy state) according to a second non-limiting example described herein.

FIG. 6 provides a schematic side view illustration of a mechanism for deploying a protection plate 602 (in a ready-to-deploy state) according to a second non-limiting example described herein. The protection plate 602 (viewed in cross-section) is attached to a structural component of the vehicle, e.g., the subframe of the vehicle 604 (e.g., by a hinge 606 which may be positioned at any position (e.g., on the outside corner of the subframe as shown, on an inside corner, along a surface, etc.) that enables deployment of the protection plate 602), and is held in a swept-back, non-vertical orientation by a mechanical telescopic shaft/pin actuator 608 (comprising a compressed spring 610 and latch release) that is attached to another portion of the subframe of the vehicle 614 at one end and to the protection plate 602 at the other. In some instances, the protection plate 602 may again further comprise a hook-like feature 612 along the top edge of the plate, as illustrated in cross-section in FIG. 6, that wraps around the front bumper beam 604 to limit the range of forward motion during deployment.

Figure 7:
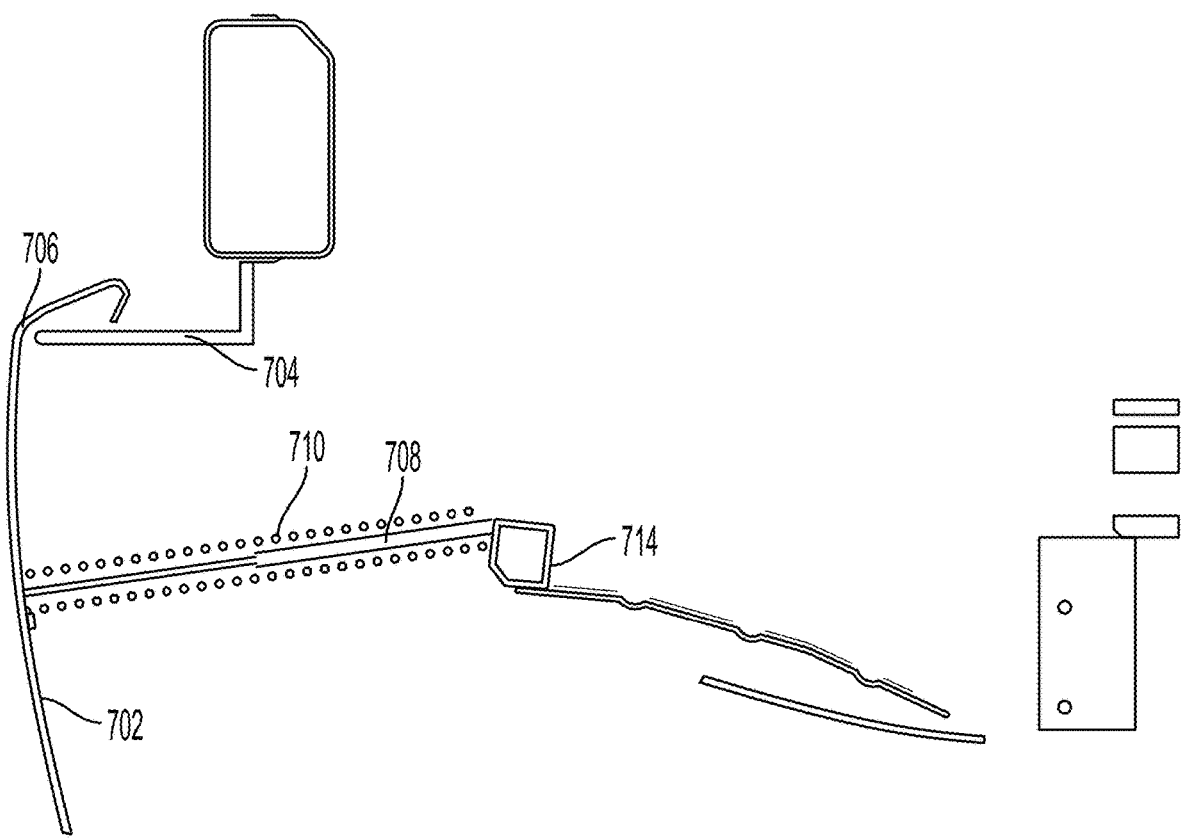
FIG. 7 provides a schematic side view illustration of a mechanism for deploying a protection plate (in a previously deployed state) according to a second non-limiting example described herein.

FIG. 7 provides a schematic side view illustration of a mechanism for deploying a protection plate 702 (i.e., the protection plate 602 of FIG. 6 in the deployed state) according to the non-limiting example illustrated in and described for FIG. 6. Upon receipt of the activation signal (sent by the object detection system (e.g., an ADAS system) or an associated component thereof) by the latch release mechanism, the spring 710 decompresses to extend the telescopic shaft of the actuator 708 attached to the vehicle subframe 714, which is locked into its extended form by the pin, and which causes the protection plate 702 to rotate relative to the axis of the hinge 706 and swing into a deployed, substantially vertical orientation in which the protection plate, or a portion thereof, is vertically-positioned between the level of the front bumper or vehicle subframe 704 and the road surface or ground on which the vehicle is traveling. In some instances, the deployed protection plate may be horizontally offset (e.g., in the forward direction) from the front bumper. The deployed protection plate 702 thus provides increased contact area for, e.g., a person's lower leg if a collision occurs, and limits the bending moment imparted to the lower leg by the impact.

Additional System Features

In some instances, the disclosed systems may further comprise one or more sensors for detecting the pitch of the vehicle (e.g., the pitch of the front hood of the vehicle), which may change under conditions of hard braking, and the actuator used to deploy the protection plate may be configured to adjust the vertical orientation of the plate to compensate for a detected change in pitch.

In some instances, the disclosed systems may further comprise a controller configured to calculate the pitch of the vehicle (e.g., the pitch of the front hood of the vehicle) based on the vehicle's velocity and braking rate, and the actuator used to deploy the protection plate may be configured to adjust the vertical orientation of the protection plate to compensate for a calculated change in pitch.

In some instances, the disclosed systems may comprise the use of artificial intelligence in combination with a controller and a plurality of sensors to detect and identify a type of object in front of the vehicle, assess the object's kinematic properties, and/or assess a likelihood of and potential consequences of impact with the object. In such instances, the protection plate may be deployed at an angle other than perpendicular to the road surface or the ground, may be positioned above or below a default deployment height, may be shifted in position relative to the front of the vehicle, may be extended or retracted in length and/or breadth, and/or may be altered in shape.

In some instances, the disclosed systems may comprise an object detection system (e.g., an ADAS system) that is further configured to send a second activation signal upon detection of a person that causes one or more additional actuators attached to the rearmost edge of the front hood of the vehicle to raise the rearmost edge of the front hood, thereby reducing the frequency and/or severity of head and upper body injuries to the person. In some instances, the disclosed systems may further comprise a front-facing airbag that is deployed if the protection plate is deployed and/or if the rearmost edge of the front hood is raised by the one or more actuators to provide an additional safety feature for reducing the frequency and/or severity of head and upper body injuries to the person.

In some instances, the feature of raising the rearmost edge of the front hood (with or without deployment of a corresponding windscreen airbag) may reduce the frequency and/or severity of head and upper body injuries resulting from vehicle-people collisions by up to 20%, 30%, 40%, 50%, 60%, 70%, 80%, or more than 80% at vehicle velocities (at the time of impact) of up to 5 mph, 10 mph, 15 mph, 20 mph, 25 mph, 30 mph, or more than 30 mph.

Methods of Use

Methods for using the disclosed devices, mechanisms, and systems are also described herein. In a typical use case scenario, detection of a person, animal, or other object within or adjacent to the projected trajectory of the automotive vehicle may trigger the object detection system (e.g., an ADAS) to initiate one or more of the steps of: (i) issuing a forward collision warning, (ii) initiating a lane change, (iii) initiating automatic emergency braking, (iv) initiating deployment of a protection plate, or (v) initiating the raising of the rearmost edge of the front hood, and (vi) deployment of a front-facing airbag.

In some instances, for example, the disclosed methods may comprise: providing a an object detection system (e.g., an ADAS system as described elsewhere herein) configured to detect a person, animal, or other object prior to impact with an automotive vehicle comprising the object detection system, where the object detection system is further configured to send a first activation signal upon detection of the person, animal, or other object; and deploying a protection plate mounted on the underside of the automotive vehicle upon receipt of the first activation signal by a first actuator that is operatively connected to the protection plate; where upon deployment the protection plate is moved from a non-vertical orientation into a vertical orientation and is positioned between a front bumper of the automotive vehicle and a surface on which the automotive vehicle is traveling.

Products

In some instances, the disclosed methods, devices, mechanisms, and systems, or combinations or components thereof, may be integrated as part of vehicle manufacture. In some instances, the disclosed methods, devices, mechanisms, and systems, or combinations or components thereof, may be sold as after-market modifications or accessories.

For example, in some instances, a system for reducing the frequency and/or severity of lower leg injuries resulting from vehicle-people collisions may comprise an object detection system (e.g., an ADAS system, or a subsystem or add-on module thereof, that may comprise, e.g., a variety of sensors used in detecting people, animals, or other objects), one or more actuators (configured for deployment of a protection plate and/or for raising a rearmost edge of the front hood), one or more latch release mechanisms, one or more protection plates and associated mounting hardware, one or more processors or controllers, one or more associated software or firmware programs (optionally stored on non-transitory computer-readable storage media), or any combination thereof.

In some instances, a subset of the items listed above may be integrated as part of vehicle manufacture and/or sold as an after-market accessory. For example, in some instances, one or more actuators (configured for deployment of a protection plate), one or more latch release mechanisms, one or more protection plates and associated mounting hardware, one or more processors or controllers, and one or more associated software or firmware programs (e.g., software or firmware for receiving an activation signal from an existing object detection system (e.g., an ADAS system) in a vehicle and communicating with a latch release mechanism) may be sold as a kit for after-market integration with the existing object detection system (e.g., ADAS system) of the vehicle.

In some instances, the associated software or firmware may be configured to provide communication between the object detection system (e.g., ADAS system (or sensor components thereof)) and one or more latch release mechanisms and/or one or more programmable actuators. In some instances, the software may be further configured to process data collected by one or more object detection system (e.g., ADAS system) sensors (e.g., image-based detection data, acoustic detection data, thermal detection data, heartbeat detection data, or any combination thereof) and provide the ability for the system to discriminate between people and inanimate objects. In some instances, the software or firmware may be further configured to calculate the pitch of the front hood of the vehicle based on the vehicle's velocity and braking rate, and to send actuator control signals to the actuator used to deploy the protection plate to adjust the vertical orientation of the protection plate to compensate for a calculated change in pitch. In some instances, the software may be further configured to provide automated reset capability for a protection plate and/or a hood-raising mechanism. In some instances, software upgrades and/or software patches may be provided (e.g., as stored on non-transitory computer-readable storage media).

Computer Systems

Figures 8A, 8B:
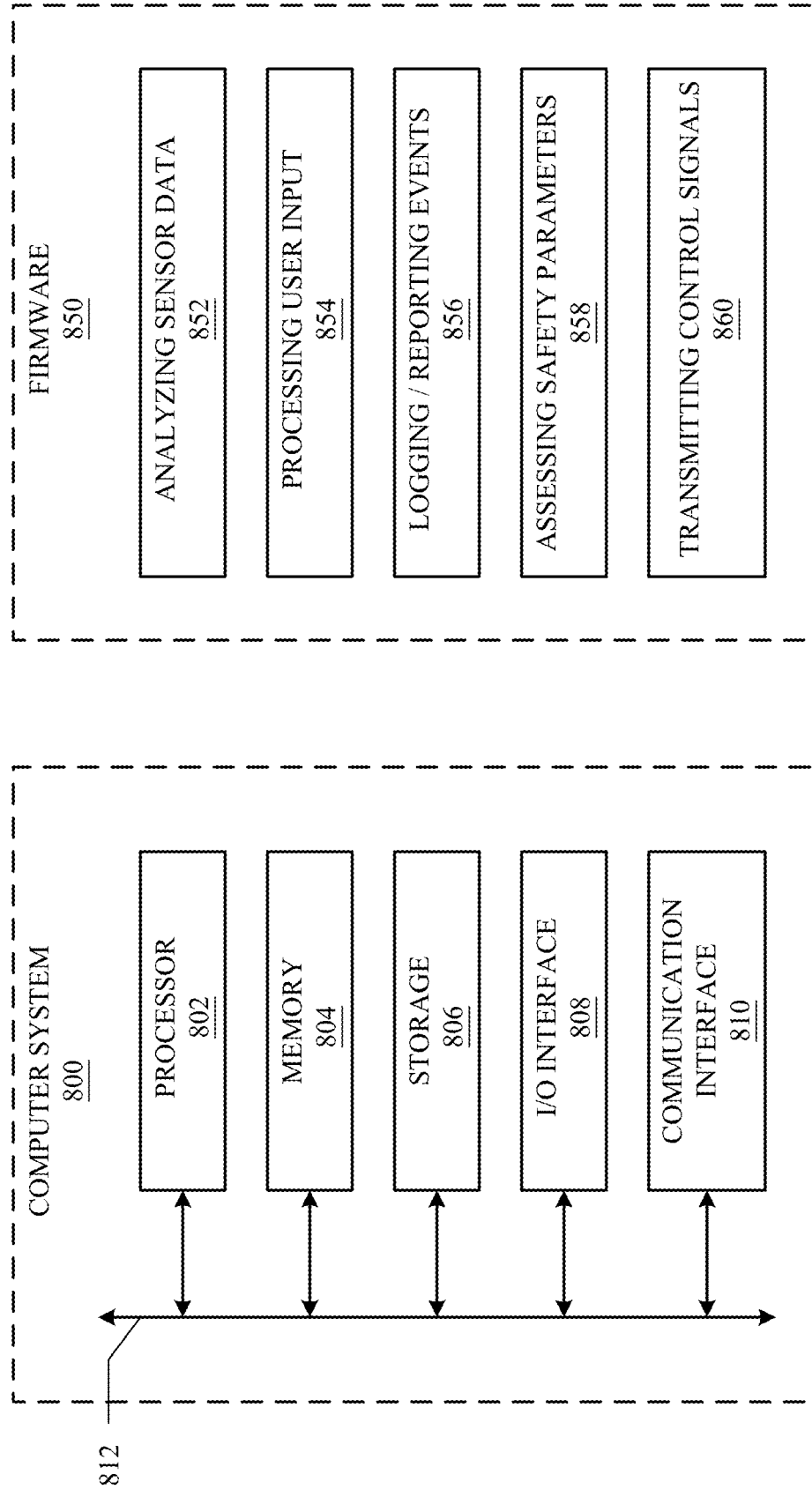
FIG. 8A is a schematic of an example computer system.
FIG. 8B illustrates example firmware for a vehicle ECU.

FIG. 8A illustrates an example computer system 800. Computer system 800 may include a processor 802, memory 804, storage 806, an input/output (I/O) interface 808, a communication interface 810, and a bus 812. Although this disclosure describes one example computer system including specified components in a particular arrangement, this disclosure contemplates any suitable computer system with any suitable number of any suitable components in any suitable arrangement. As an example and not by way of limitation, computer system 800 may be an electronic control unit (ECU), an embedded computer system, a system-on-chip, a single-board computer system, a desktop computer system, a laptop or notebook computer system, a mainframe, a mesh of computer systems, a mobile telephone, a personal digital assistant, a server computing system, a tablet computer system, or a combination of two or more of these. Where appropriate, computer system 800 may include one or more computer systems 800; be unitary or distributed, span multiple locations, machines, or data centers; or reside in a cloud, which may include one or more cloud components in one or more networks. Where appropriate, computer system(s) 800 may perform, at different times or at different locations, in real time or in batch mode, one or more steps of one or more methods described or illustrated herein.

Processor 802 may include hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. Processor 802 may include one or more internal caches for data, instructions, or addresses.

In particular embodiments, memory 804 includes main memory for storing instructions for processor 802 to execute or data for processor 802 to operate on. In particular embodiments, one or more memory management units (MMUs) reside between processor 802 and memory 804 and facilitate accesses to memory 804 requested by processor 802. In particular embodiments, memory 804 includes random access memory (RAM). This disclosure contemplates any suitable RAM.

In particular embodiments, storage 806 includes mass storage for data or instructions. As an example and not by way of limitation, storage 806 may include a removable disk drive, flash memory, an optical disc, a magneto-optical disc, magnetic tape, or a Universal Serial Bus (USB) drive or two or more of these. Storage 806 may include removable or fixed media and may be internal or external to computer system 800. Storage 806 may include any suitable form of non-volatile, solid-state memory or read-only memory (ROM).

In particular embodiments, I/O interface 808 includes hardware, software, or both, providing one or more interfaces for communication between computer system 800 and one or more input and/or output (I/O) devices. Computer system 800 may be communicably connected to one or more of these I/O devices, which may be incorporated into, plugged into, paired with, or otherwise communicably connected to vehicle 100 (e.g., through a TCM ECU). An input device may include any suitable device for converting volitional user input into digital signals that can be processed by computer system 800, such as, by way of example and not limitation, a steering wheel, a touch screen, a microphone, a joystick, a scroll wheel, a button, a toggle, a switch, a dial, or a pedal. An input device may include one or more sensors for capturing different types of information, such as, by way of example and not limitation, sensors 110 described above. An output device may include devices designed to receive digital signals from computer system 800 and convert them to an output format, such as, by way of example and not limitation, speakers, headphones, a display screen, a heads-up display, a lamp, a smart vehicle accessory, another suitable output device, or a combination thereof. This disclosure contemplates any suitable I/O devices and any suitable I/O interfaces 808 for them. I/O interface 808 may include one or more I/O interfaces 808, where appropriate.

In particular embodiments, communication interface 810 includes hardware, software, or both providing one or more interfaces for data communication between computer system 800 and one or more other computer systems 800 or one or more networks. Communication interface 810 may include one or more interfaces to a controller area network (CAN) or to a local interconnect network (LIN). Communication interface 810 may include one or more of a serial peripheral interface (SPI) or an isolated serial peripheral interface (isoSPI). In some embodiments, communication interface 810 may include a network interface controller (NIC) or network adapter for communicating with an Ethernet or other wire-based network or a wireless NIC (WNIC) or wireless adapter for communicating with a wireless network, such as a WI-FI network or a cellular network.

In particular embodiments, bus 812 includes hardware, software, or both coupling components of computer system 800 to each other. Bus 812 may include any suitable bus, as well as one or more buses 812, where appropriate. Although this disclosure describes a particular bus, any suitable bus or interconnect is contemplated.

Herein, a computer-readable non-transitory storage medium or media may include one or more semiconductor-based or other integrated circuits (ICs) (such, as for example, field-programmable gate arrays or application-specific ICs), hard disk drives, hybrid hard drives, optical discs, optical disc drives, magneto-optical discs, magneto-optical drives, solid-state drives, RAM drives, any other suitable computer-readable non-transitory storage media, or any suitable combination. A computer-readable non-transitory storage medium may be volatile, non-volatile, or a combination of volatile and non-volatile, where appropriate.

FIG. 8B illustrates example firmware 850 for a vehicle ECU 800 as described with respect to control system 130. Firmware 850 may include functions 852 for analyzing sensor data based on signals received from sensors 110 or cameras 120 received through communication interface 810. Firmware 850 may include functions 854 for processing user input (e.g., directly provided by a driver of or passenger in vehicle 100, or provided through a computing device 150) received through I/O interface 808. Firmware 850 may include functions 856 for logging detected events (which may be stored in storage 806 or uploaded to the cloud), as well as functions for reporting detected events (e.g., to a driver or passenger of the vehicle through an instrument display or interactive interface of the vehicle, or to a vehicle manufacturer, service provider, or third party through communication interface 810). Firmware 850 may include functions 858 for assessing safety parameters (e.g., monitoring the temperature of a vehicle battery or the distance between vehicle 100 and nearby vehicles). Firmware 850 may include functions 860 for transmitting control signals to components of vehicle 100, including other vehicle ECUs 800.

EXAMPLES

Example 1—Impact Testing of Protection Plate Mechanisms

Figure 9A:
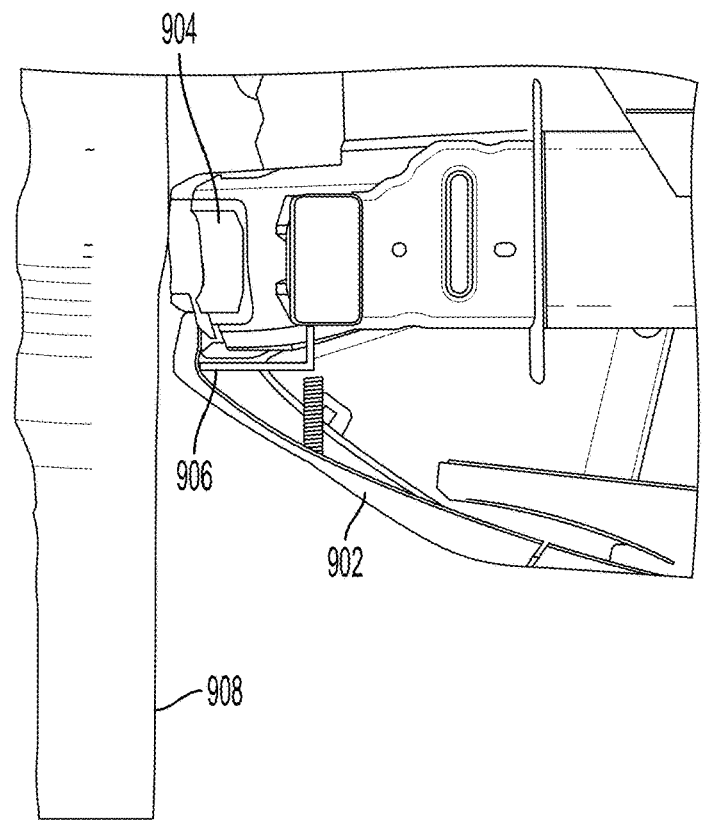
FIG. 9A provides a cutaway side view of a mechanism for deploying a protection plate (in a ready-to-deploy state) according to one non-limiting example described herein.
Figure 9B:
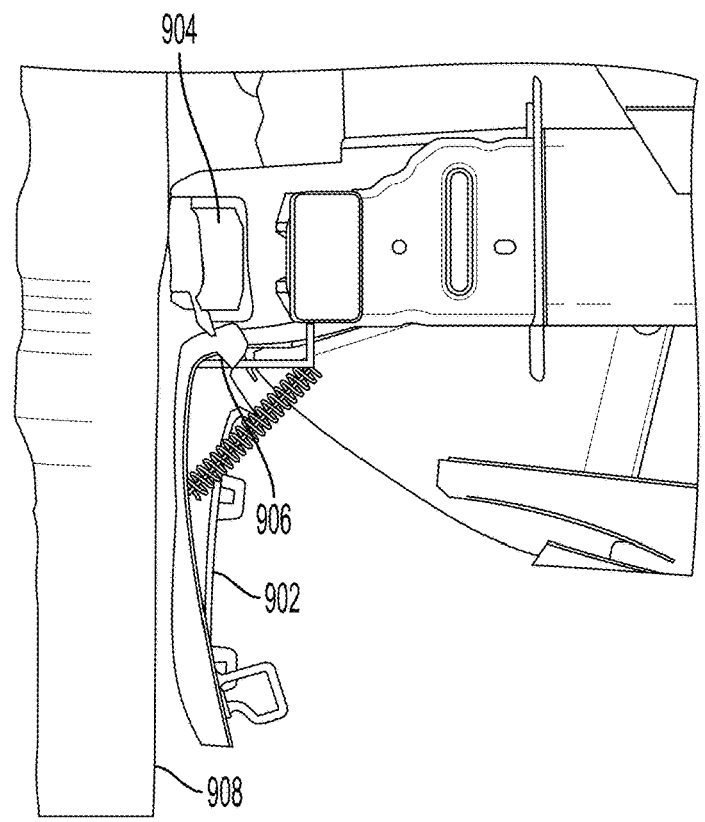
FIG. 9B provides a cutaway side view of a mechanism for deploying a protection plate (in a deployed state) according to one non-limiting example described herein.

FIG. 9A provides a cutaway side view of a mechanism for deploying a protection plate 902 (in a ready-to-deploy state) according to one non-limiting example described herein. In this design, the protection plate 902 is mounted to the front bumper beam 904 of the vehicle using a hinge mechanism 906. FIG. 9B provides a cutaway side view of the same protection plate mechanism in the deployed state.

The leftmost vertical object shown in both FIG. 9A and FIG. 9B represents an object (e.g., a person's leg) in the path of the vehicle.

As can be seen in FIG. 9B, the deployed protection plate 902 provides a large contact surface which spreads the impact force of a collision over a larger area, and thus distributes the force along the object (e.g., the lower leg of a pedestrian) to reduce the frequency and/or severity of injuries. The protection plate 902 also helps to limit the amount of bending (e.g., knee bending) that may result from the impact.

Figure 10A:
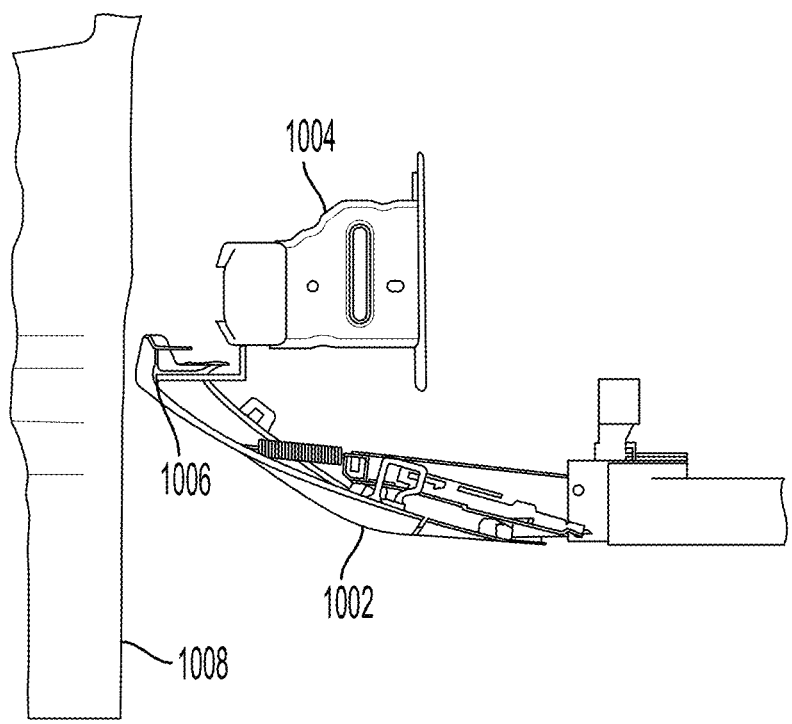
FIG. 10A provides a cutaway side view of a mechanism for deploying a protection plate (in a ready-to-deploy state) according to the second non-limiting example described herein.
Figure 10B:
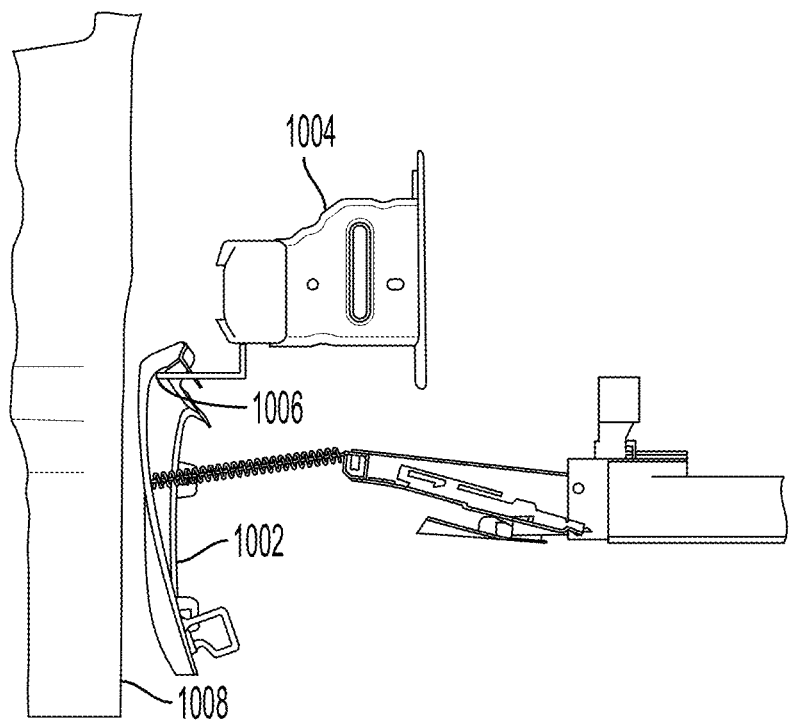
FIG. 10B provides a cutaway side view of a mechanism for deploying a protection plate (in a deployed state) according to the second non-limiting example described herein.

FIG. 10A provides a cutaway side view of a mechanism for deploying a protection plate 1002 (in a ready-to-deploy state) according to one non-limiting example described herein. In this design, the protection plate 1002 is mounted to the substructure of the vehicle 1004 using a hinge mechanism 1006. FIG. 10B provides a cutaway side view of the same protection plate mechanism in the deployed state.

Again, the leftmost vertical object shown in both FIG. 10A and FIG. 10B represents an object (e.g., the leg of a person) in the path of the vehicle. As can be seen in FIG. 10B, in this design the deployed protection plate 1002 also provides a large contact surface which spreads the impact force of a collision over a larger area, and also helps to limit the amount of bending (e.g., knee bending) that may result from the impact.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system for reducing lower leg injuries resulting from automotive vehicle-human collisions, the system comprising:
   an object detection system configured to detect a human prior to impact with an automotive vehicle comprising the object detection system, and further configured to send a first activation signal upon detection of the human;
   a first actuator attached to the automotive vehicle; and
   a protection plate operatively connected to the first actuator and mounted on a structural component of the automotive vehicle;
   wherein the first actuator is configured to, upon receipt of the first activation signal, deploy the protection plate from a non-vertical orientation into a vertical orientation and vertically-position the protection plate between a level of a front bumper of the automotive vehicle and a travel surface of the automotive vehicle, and
   wherein the first actuator is configured to adjust the vertical orientation of the protection plate to compensate for a pitch of the automotive vehicle.

2. The system of claim 1, wherein the detection of the human comprises the use of radio detection and ranging (Radar), light detection and ranging (Lidar), image-based detection, acoustic detection, thermal detection, heartbeat detection, or any combination thereof.

3. The system of claim 1, wherein the human is detected if they are present within or proximal to a trajectory of the vehicle.

4. The system of claim 1, wherein the human is detected if they are present within 100, 90, 80, 70, 60, 50, 40, 30, 20, or 10 feet of the front of the automotive vehicle.

5. The system of claim 1, wherein the object detection system is further configured to discriminate between humans and inanimate objects, and sends the first activation signal only if a human is detected.

6. The system of claim 1, wherein the system further comprises a sensor module for detecting the pitch of the automotive vehicle.

7. The system of claim 1, wherein the object detection system is further configured to send a second activation signal upon detection of the human, and the system comprises a second actuator configured to raise a rearmost edge of a front hood of the automotive vehicle upon receipt of the second activation signal.

8. The system of claim 1, wherein the first actuator comprises a mechanical, electromechanical, pneumatic, hydraulic, or pyrotechnic actuator.

9. The system of claim 8, wherein the first actuator is a mechanical actuator comprising a compressed spring and telescopic shaft/pin mechanism.

10. The system of claim 1, wherein the protection plate is deployed within 1.0 seconds of detecting a human.

11. The system of claim 1, wherein the protection plate is attached to the automotive vehicle by a hinged mechanism such that it rotates from the non-vertical orientation into the vertical orientation when deployed.

12. The system of claim 1, wherein the automotive vehicle comprises a high approach angle.

13. The system of claim 1, wherein the protection plate is configured to be returned to its stowed position after deployment.

14. A method for reducing lower leg injuries resulting from automotive vehicle-human collisions, the method comprising:
   providing an object detection system configured to detect a human prior to impact with an automotive vehicle comprising the object detection system, wherein the object detection system is further configured to send a first activation signal upon detection of the human; and
   deploying a protection plate mounted on a structural component of the automotive vehicle upon receipt of the first activation signal by a first actuator that is operatively connected to the protection plate;
   wherein upon deployment the protection plate is moved from a non-vertical orientation into a vertical orientation and is vertically-positioned between a level of a front bumper of the automotive vehicle and a surface on which the automotive vehicle is traveling, and
   wherein the first actuator is configured to adjust the vertical orientation of the protection plate to compensate for a pitch of the automotive vehicle.

15. The method of claim 14, wherein the detection of the human comprises the use of radio detection and ranging (Radar), light detection and ranging (Lidar), image-based detection, acoustic detection, thermal detection, heartbeat detection, or any combination thereof.

16. The method of claim 14, wherein the object detection system is further configured to discriminate between humans and inanimate objects, and sends the first activation signal only if a human is detected.

17. The method of claim 14, wherein the method further comprises providing a sensor module for detecting the pitch of the automotive vehicle.

18. The method of claim 14, wherein the object detection system is further configured to send a second activation signal upon detection of the human, and the method further comprises use of a second actuator to raise a rearmost edge of a front hood of the automotive vehicle upon receipt of the second activation signal.

19. The method of claim 14, wherein the protection plate is deployed within 1.0 seconds of detecting a human.

20. A non-transitory computer readable medium storing one or more programs, the one or more programs comprising instructions which, when executed by one or more processors of a system, cause the system to:
   send a first activation signal upon detection of a human by an object detection system configured to detect a human prior to impact with an automotive vehicle comprising the object detection system; and
   deploy a protection plate mounted on a structural component of the automotive vehicle upon receipt of the first activation signal by a first actuator that is operatively connected to the protection plate;
   wherein upon deployment the protection plate is moved from a non-vertical orientation into a vertical orientation and is vertically-positioned between a level of a front bumper of the automotive vehicle and a surface on which the automotive vehicle is traveling, and
   wherein the first actuator is configured to adjust the vertical orientation of the protection plate to compensate for a pitch of the automotive vehicle.

* * * * *